United States Patent
Pellenc et al.

(10) Patent No.: US 6,786,287 B2
(45) Date of Patent: Sep. 7, 2004

(54) TOOL FOR SOIL CULTIVATING MACHINE, AND MACHINE USING SUCH TOOLS

(75) Inventors: Roger Pellenc, Pertuis (FR); Robert Delran, Pertuis (FR)

(73) Assignee: Pellenc, Pertuis (FR)

( * ) Notice: Subject to any disclaimer, the term of this patent is extended or adjusted under 35 U.S.C. 154(b) by 9 days.

(21) Appl. No.: 09/784,094

(22) Filed: Feb. 16, 2001

(65) Prior Publication Data

US 2001/0015278 A1 Aug. 23, 2001

(30) Foreign Application Priority Data

Feb. 18, 2000  (EP) ............................................. 00430007

(51) Int. Cl.$^7$ ............................................. A01B 33/00
(52) U.S. Cl. .......................... 172/545; 172/96; 172/110
(58) Field of Search .............................. 172/48, 57, 56, 172/91, 96, 110, 111, 122, 518, 540, 545, 548, 549, 554, 556, 13, 15; 56/255, 295

(56) References Cited

U.S. PATENT DOCUMENTS

| | | | | |
|---|---|---|---|---|
| 13,885 A | * | 12/1855 | Kramer | 396/564 |
| 1,606,623 A | * | 11/1926 | Foot | 172/544 |
| 1,670,539 A | * | 5/1928 | Hicks | 172/544 |
| 1,757,511 A | * | 5/1930 | Brewer | 172/544 |
| 2,215,364 A | | 9/1940 | Simmons et al. | |
| 2,275,446 A | * | 3/1942 | Leeper | 172/103 |
| 2,309,157 A | * | 1/1943 | Ariens | 172/544 |
| 2,700,926 A | * | 2/1955 | Goit | 172/545 |
| 2,751,737 A | * | 6/1956 | Herod | 56/12.7 |
| 2,816,499 A | * | 12/1957 | Osthaus | 172/96 |
| 3,246,704 A | * | 4/1966 | Honda | 172/96 |
| 3,897,831 A | | 8/1975 | Van der Lely | |
| 3,993,144 A | | 11/1976 | van der Lely | |
| 4,050,519 A | * | 9/1977 | van der Lely | 172/111 |
| 4,164,258 A | * | 8/1979 | van der Lely | 172/91 |
| 4,183,412 A | | 1/1980 | van der Lely | |
| 4,291,637 A | * | 9/1981 | van der Lely | 111/11 |
| 4,301,871 A | * | 11/1981 | van der Lely et al. | 172/49.5 |
| 4,611,669 A | * | 9/1986 | Ballard | 172/545 |
| 4,629,007 A | * | 12/1986 | Pegoraro | 172/548 |
| 4,706,761 A | * | 11/1987 | Herscher et al. | 172/545 |
| 4,778,012 A | * | 10/1988 | Kobashi et al. | 172/91 |
| 5,272,861 A | * | 12/1993 | Roynberg | 172/91 |

FOREIGN PATENT DOCUMENTS

| | | |
|---|---|---|
| DE | 2845029 | 5/1979 |
| DE | 3341040 | 5/1985 |
| GB | 1032663 | 6/1966 |
| GB | 2032744 A1 * | 5/1980 |
| GB | 2039201 A * | 8/1980 |
| GB | 2128461 A1 * | 5/1984 |
| NL | 8004449 | 11/1990 |

* cited by examiner

Primary Examiner—Robert E. Pezzuto
Assistant Examiner—Nathan S Mammen
(74) Attorney, Agent, or Firm—Greenblum & Bernstein, P.L.C.

(57) ABSTRACT

Device for a soil cultivating machine, comprising a rotor. A plurality of tools are mounted on the rotor. At least one tool of the plurality comprises a fixing end, a soil engaging portion, and a connecting portion which connects the fixing end to the soil engaging portion. The at least one tool is movably mounted to the rotor.

40 Claims, 6 Drawing Sheets

TOOL FOR SOIL CULTIVATING MACHINE, AND MACHINE USING SUCH TOOLS

CROSS-REFERENCE TO RELATED APPLICATIONS

The present application claims priority under 35 U.S.C. § 119 of European Patent Application No. 00430007.5 filed on Feb. 18, 2000, the disclosure of which is expressly incorporated by reference it its entirety.

BACKGROUND OF THE INVENTION

1. Field of the Invention

The present invention relates to a tool for a soil cultivating machine, of the type having a rotor rotatable about a vertical or substantially vertical axis, and provided, at its periphery, with soil cultivating interchangeable tools. It also relates to soil cultivating machines using these tools, such as weeding machines, hoeing machines, vineyard plows, etc., all of which are adapted to root out and/or to shred weeds and noxious plants and/or to loosen the ground surface.

2. Background and Material Information

The current configuration of tools for hoeing or similar ground-working operation, used in machines of the aforementioned type, does not take into account all of the problems due to the rotation of these tools in the ground, such as resistance to penetration, rapid wear, resistance of the lumps to break up, violence of impacts upon striking stones, etc., such that their efficiency as well as their possible period of service are affected.

Figure 1:
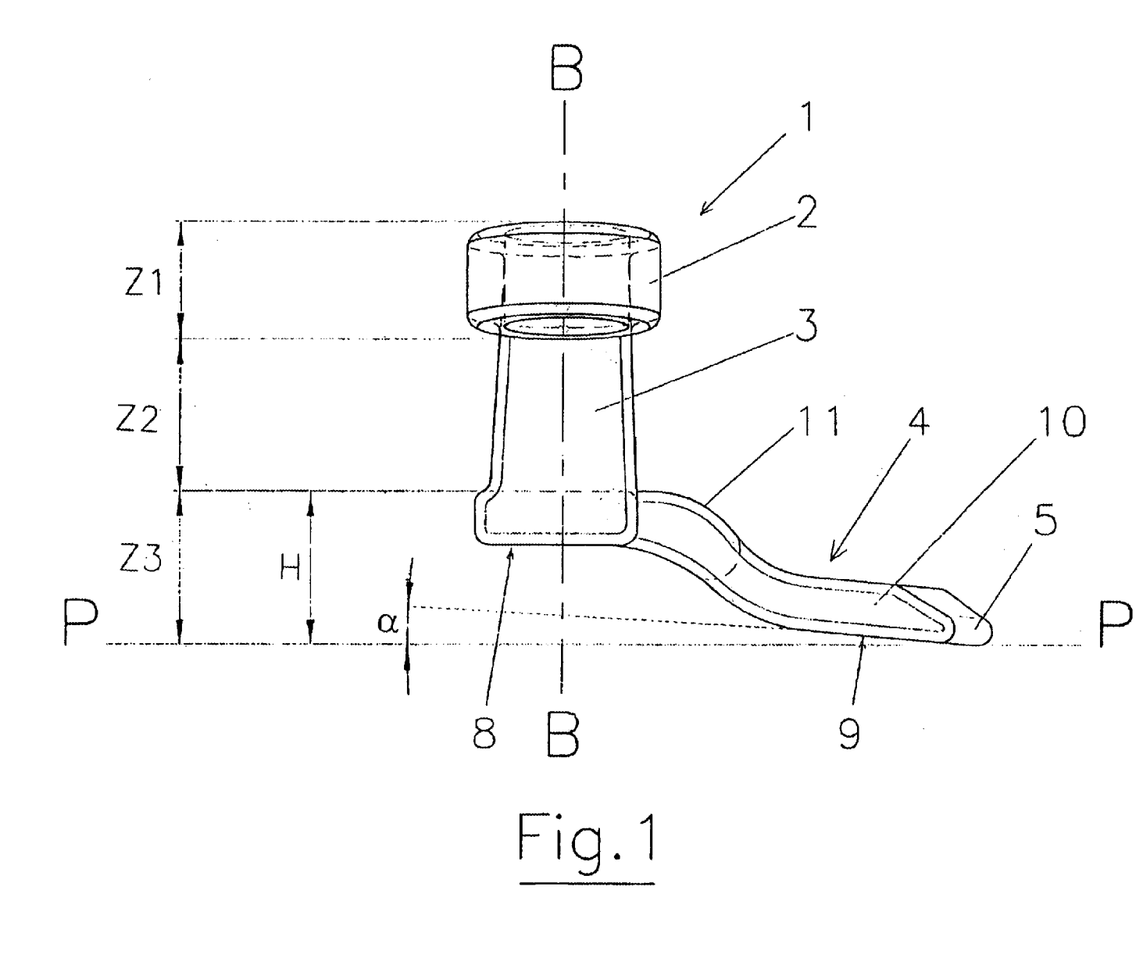
FIG. 1 is an elevational view of a first advantageous example of embodiment of the weeding tool according to the invention.
Figures 2, 3, 4:
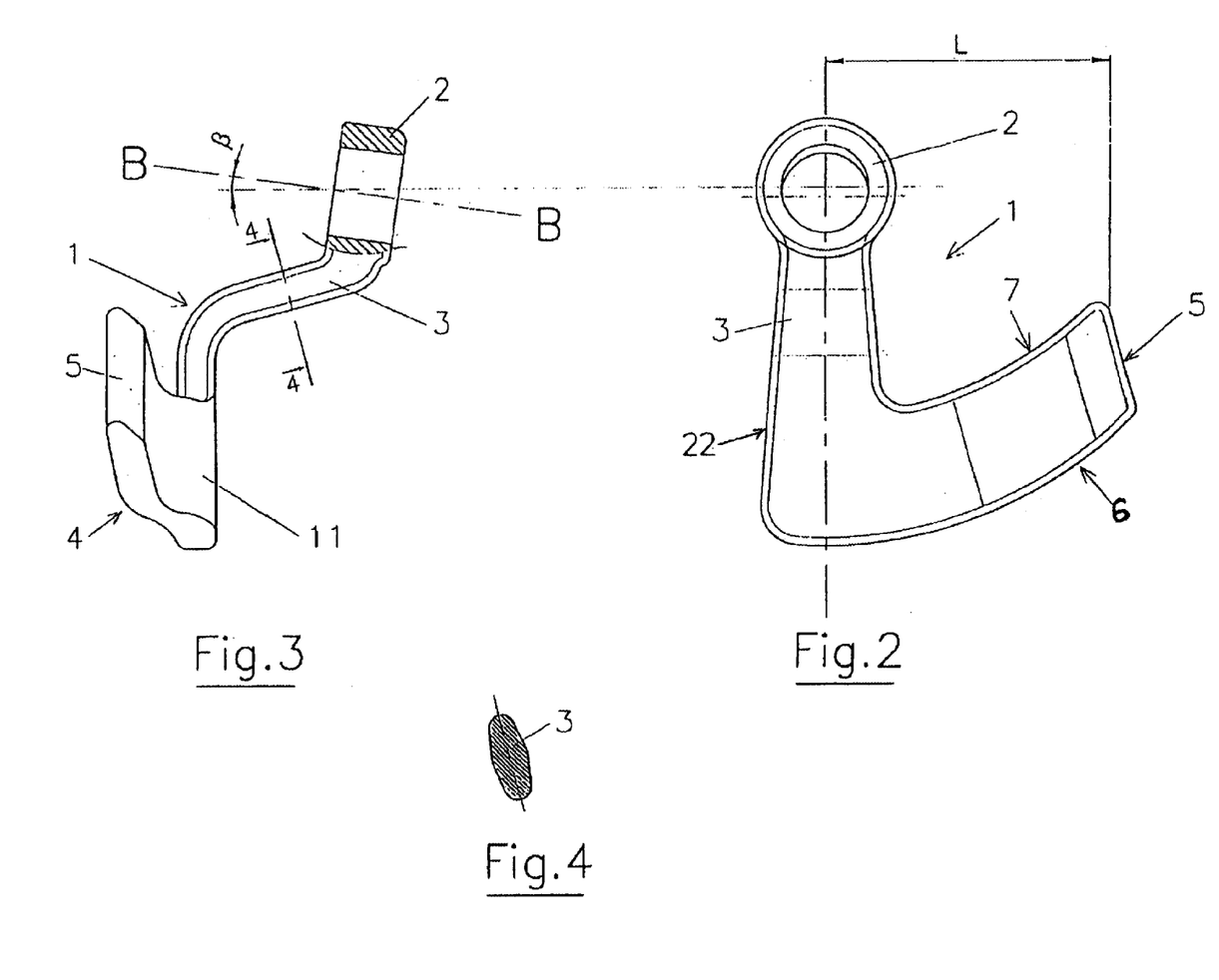
FIG. 2 is a planar view of this tool.
FIG. 3 is a front view, with partial cross-section, of the tool.
FIG. 4 is a cross-sectional view along the line 4—4 of FIG. 3.

For example, the document DE-3.341.040 A shows, in FIGS. 4 and 4a, an agricultural soil cultivating machine having a fixing end located in an upper spatial zone, a connecting, portion located in an intermediate spatial zone, and an active portion located in a lower spatial zone. The fixing end of this tool is provided with two holes enabling the tool to be positioned fixedly, by means of bolts, on a rubber rotatable plate. This mounting of the tools on a relatively flexible support is inadequate in efficiently protecting the sharp edges of the tools when they strike stones or other hard bodies during operation. One can imagine that the tools are quickly put out of service.

The document U.S. Pat. No. 9,915,364 shows a rotary cultivator also having a fixing end located in an upper spatial zone, a connecting portion located in an intermediate spatial zone, and an active portion located in a lower spatial zone. The fixing end of this tool is housed in a hole of the rotatable hub, and it is fixed by means of a pin, whereas its intermediate portion extends through a slot provided in the cylindrical side wall of the hub.

SUMMARY OF THE INVENTION

One of the objects of the invention described in this document is to make it possible to attach the tools in either one of two possible positions corresponding to two diameters of the hoeing heads. In this case also, the tools are fixedly positioned on the rotatable hub, such that they are very exposed to impacts that shorten their period of service.

An object of the invention is to propose a tool and a machine providing a better solution to the aforementioned problems.

According to the invention, there is provided an interchangeable tool including, in view of its normal operative position: a fixing end located in an upper space zone, this end being arranged or configured so as to enable it to be mounted, with freedom of pivoting, on the rotor of a soil cultivating machine, such as a weeding machine or a similar machine; a connecting portion located in an intermediate spatial zone and extending downwardly from the fixing end; and an active portion located in a lower space zone. The connecting portion can advantageously have an inclined position with respect to the fixing end and the active portion, such that the latter are distant from one another, both in the vertical direction and in the horizontal direction.

Due to these arrangements, the tools penetrate more easily into the ground; they are subject to less substantial frictions, such that they wear out less quickly; and these advantages yield another advantage constituted by a lower energy consumption.

Furthermore, the tools are tensioned by the centrifugal force when the rotor rotates, and they retract by pivoting on their fixing axis, when they encounter a rock or other hard obstacle.

According to another characteristic arrangement, the active portion of the tool extends forwardly, considering the direction of rotation of me tool during operation, from the distal end of the connecting portion.

Due to this arrangement, the lower active portion of the tool has a substantial reserve of material, and can durably and efficiently fulfil its function, despite a substantial wear.

According to an alternative embodiment, the sharp leading edge of the lower active portion of the tools is curved, and the active portion extends rearwardly, considering the direction of rotation of the tool during operation, from the distal end of the connecting portion.

This tool is better suited to soils covered with thick grass due to its self-unclogging effect that prevents clogging.

Furthermore, although it is provided to obtain the tool in a single piece, the active portion or at least the front portion of the active portion of the tool could be interchangeable or attached, by screwing, welding or otherwise, this front portion then being made out of a very hard material such as tungsten carbide, stellite, etc., or having been previously subject to hard coatings by pelletizing, powdering, projection, etc., whereas the remaining portion the tool is made of a softer and less expensive material (such as steel, for example).

According to another characteristic arrangement, the front portion of the active portion of the tool is inclined forwardly, the lower surface of the front portion advantageously forming a small rake angle, with a plane perpendicular to the pivoting axis of the tool.

This arrangement makes it possible to avoid the "slip heel soil pressure" and to preserve the operating depth, despite the wear.

According to another characteristic arrangement, the upper surface of the active portion of the tool includes a boss located after its front portion, considering its direction of rotation, this boss making it possible to pulverize the ground.

The weeding machine according to the invention is characterized in that its rotor is arranged so as to enable the mounting, with freedom of pivoting, of at least two previously described tools, preferably under conditions such that when they are installed on the rotor, their pivoting axes converge downwardly toward the axis of rotation of the latter, by forming an angle with the axis of rotation.

As indicated previously, when the tools encounter an obstacle, they retract by pivoting rearwardly about their pivoting axis, thus absorbing the impacts and preventing the weeding machine head assembly from becoming unstable. During such a retracting phase (which can result either from striking a hard obstacle such as a stone or the like, or from an excessive compactness of the ground), the operating depth is reduced due to the aforementioned angle, which makes it possible to avoid the obstacle and to limit the torque and, therefore, the power to be transmitted to maintain the rotating speed of the rotor.

The invention also provides for a device for a soil cultivating machine, comprising a rotor. A plurality of tools are mounted to the rotor. At least one tool of the plurality comprises a fixing end, a soil engaging portion, and a connecting portion which connects the fixing end to the soil engaging portion. The at least one tool is movably mounted to the rotor.

The fixing end of the at least one tool may be pivotally mounted to the rotor. The soil cultivating machine may comprise one of a weeding machine, a hoeing machine, and a vineyard plow. The at least one tool may be interchangeably mounted to the rotor. The connecting portion may be arranged to be inclined relative to a center axis running through the rotor. The soil engaging portion may extend radially outwards from the fixing end. The fixing end may comprise a ring adapted to receive a journal axle, the journal axle movably mounting the fixing end to the rotor. The at least one tool comprises a shape which resembles a hook or an "L". The soil engaging end may comprise a leading edge and at least one curved portion.

The soil engaging portion may comprise a sharp leading edge and at least one curved surface. The soil engaging portion may have an inclined portion and includes a first lower surface and a second lower surface, the first lower surface being arranged above the second lower surface when the at least one tool is mounted to the rotor. The soil engaging portion may comprise a boss portion.

The rotor may be rotatably mounted to the soil cultivating machine. Each of the plurality of tools may be pivotally mounted to the rotor. Each of the tools may be adapted to pivot freely between an angle of 0° to 180° or more. Alternatively, each of the tools may be adapted to pivot freely between an angle of 45° to 65°. Each of the tools may be mounted about an axis which is not parallel to a center axis of the rotor. The at least one tool may be mounted about an axis which is not parallel to a center axis of the rotor.

The device may further comprise a guide arranged adjacent the rotor. The device may further comprise a fixing flange arranged to help retain the at least one tool on the rotor.

The invention also provides for a device for a soil cultivating machine, comprising a rotor adapted to be rotatably mounted to the soil cultivating device. A plurality of tools are interchangeably mounted to the rotor. Each of the plurality of tools comprises a fixing end, a soil engaging portion, and a connecting portion which connects the fixing end to the soil engaging portion. Each fixing end is movably fixed to the rotor via an axle. Each soil engaging portion comprises a curved member having a leading edge. A mechanism biases the tools against the rotor.

The invention further provides for a device for a soil cultivating machine, comprising a rotor adapted to be rotatably mounted to the soil cultivating device. A plurality of tools are interchangeably mounted to the rotor. Each of the plurality of tools comprises a fixing end, a soil engaging portion, and a connecting portion which connects the fixing end to the soil engaging portion. Each fixing end comprises a ring portion which is movably fixed to the rotor via an axle. Each soil engaging portion is arranged below the ring portion and comprises a plate like member having a leading edge. A mechanism biases the tools against the rotor. Each of the axles is oriented at an angle relative of a center axis of the rotor.

BRIEF DESCRIPTION OF DRAWINGS

The aforementioned objects, characteristics and advantages and still others, will become more apparent from the description that follows, with reference to the annexed drawings, in which.

DETAILED DESCRIPTION OF THE PREFERRED EMBODIMENTS

Reference is made to the drawings to describe advantageous embodiments, although in no way limiting, of the tool and of the weeding machine according to the invention.

According to a first characteristic arrangement, and a first example of embodiment shown in FIGS. 1–7, this tool, generally designated by the numeral reference 1, includes (considering its position during operation):

a fixing end 2 located in an upper spatial zone Z1, this end being arranged or configured so that it can be connected to the rotor of a soil cultivating machine; such as weeding machine;

a connecting portion 3 located in an intermediate spatial zone Z2, this intermediate portion extending downwardly from the fixing end; and an active portion 4 located in a lower spatial zone Z3.

The connecting portion 3 can advantageously have an inclined position with respect to the fixing end 2 and the active portion 4, such that the latter are distant from one another, both in the vertical direction (FIG. 1) and in the horizontal direction (FIG. 2).

The upper fixing end 2 of the tool is advantageously arranged or configured to enable it to be mounted with freedom of pivoting over a limited amplitude, on the rotor arranged to enable this mounting of a weeding machine or other soil cultivating machine, this end being constituted, for example, by a fixing ring or bush enabling the mounting of the tool about a journal axis, as is explained subsequently in the present disclosure.

The lower active portion 4 of the tool extends forwardly, considering the direction of rotation of the latter, from the distal end of the connecting portion 3.

This active portion 4 has a low height H corresponding the height of the zone Z3 in which such portion moves, this height being preferably lower than half the total height Z1+Z2+Z3 of the tool.

The active portion 4, seen in the direction of the pivoting axis B—B of the tool 1, or along the axis of rotation of the rotor on which the latter is adapted to be mounted, a bent shape demarcated by a leading edge 5, a convex outer edge 6, and a concave inner edge 7, the leading edge having a position inclined forwardly and toward the inner edge 7, in relation to a radius joining the pivoting axis of the tool to the front end of the convex outer end 6 (FIG. 2). The active portion 4 is thus presented in the form of a curved band oriented forwardly and at a distance from the fixing end 2 of the tool.

Furthermore, the active portion 4 has a length L which, during retraction, makes it possible to preserve the operating width and, therefore, to draw a tangent to the vinestock.

The leading edge 5 of the active portion 4 is beveled to facilitate the penetration into the ground.

The active portion 4 is inclined forwardly, such that the lower surface 8 of its rear portion for connecting to the intermediate portion 3 is positioned at a substantially higher level than that at which the lower surface 9 of its working front portion 10 is located.

Furthermore, the lower surface 9 of the front portion 10 is approximately planar and forms a small rake angle α, for example on the order of 6°, with a plane P—P substantially perpendicular to the pivoting axis B—B of the tool.

The upper surface of the active portion 4 of the tool includes a boss 11 located after its front portion, at a distance from the leading edge 5.

The previously described interchangeable tool can be obtained in a single piece from wear resistant steel or steel alloy, forged and treated. However, according to another characteristic arrangement of the invention, it is provided to obtain its active portion, or at least the working front portion 10 thereof in an extra hard material such as tungsten carbide, stellite, etc., or in a material treated to become very hard, and to attach this portion or active portion on the remaining portion of the tool by screwing, welding or the like.

Figure 5:
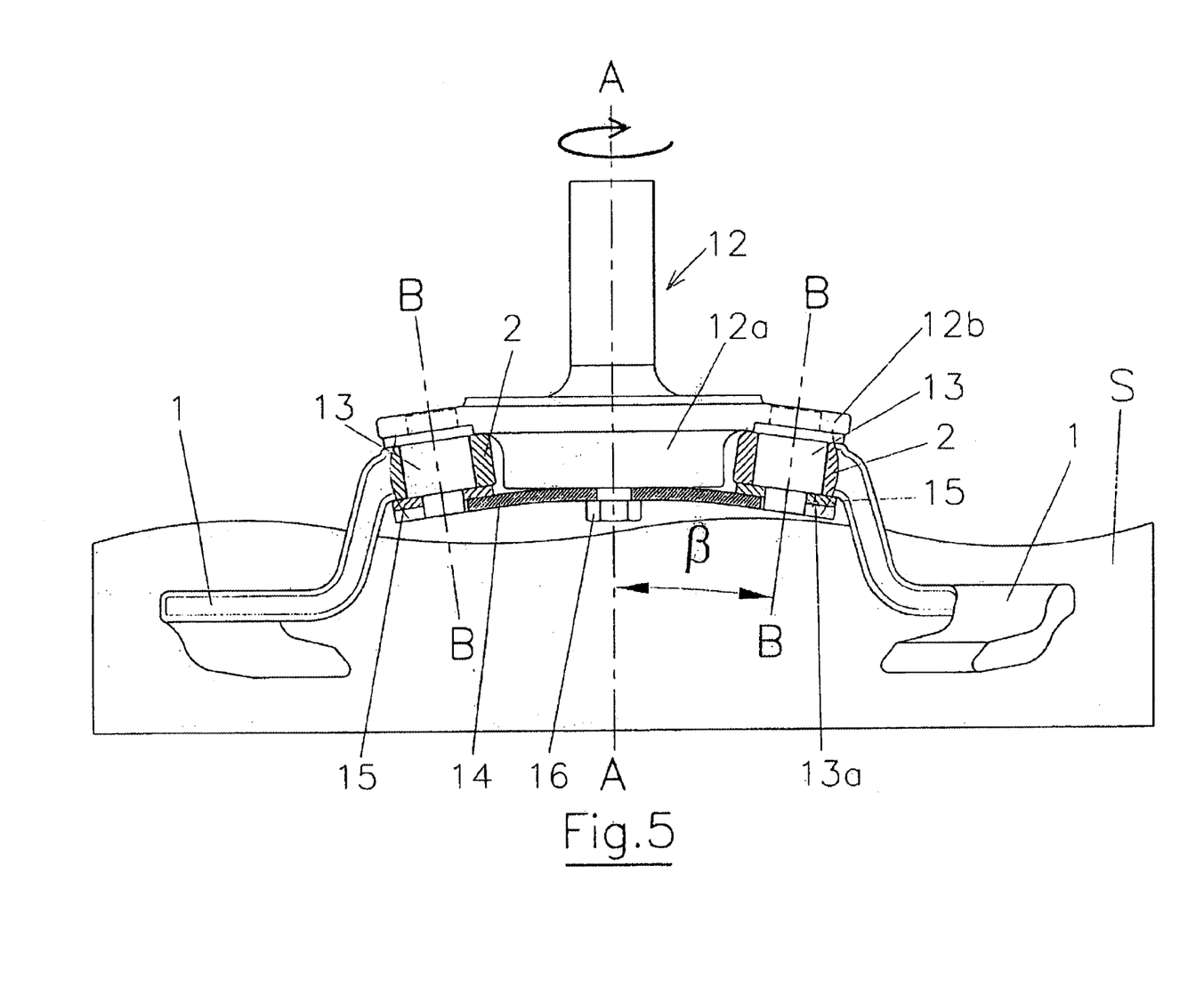
FIG. 5 is a simplified front view, with partial cross-sections, of a weeding machine head according to the invention.

FIG. 5 shows a simplified example of embodiment of a soil cultivating machine head, which is constituted by a weeding machine or similar machine of which only the rotor 12, the tools 1 and the removable fixing system thereof are shown in a position of cultivating the soil S.

The rotor 12, the tools 1 and the removable fixing system thereof are arranged and configured to enable the mounting of at least two tools 1 on the rotor 12, with freedom of pivoting during operation. Advantageously, this mounting is carried out under such conditions that when they are installed on the rotor, their pivoting axes B—B converge downwardly coward the axis A—A of the latter, by forming an angle β with the axis of rotation A—A, for example an angle on the order of 9°.

The removable fixing system of the tools includes for each of them, a journal axle 13 around which the journal ring 2 of the tool is mounted with a pivoting ability. One of the ends of this journal axle is housed in a bore provided in the vicinity of the periphery of the rotor 12, whereas its opposite end is engaged in an opening made in a fixing flange 14. A pressure washer 15 can be arranged around the lower end of the journal axle 13, between a circular shoulder 13a thereof and the fixing flange 14, so as to enable the tool to pivot.

The holes provided in the rotor 12 for mounting the interchangeable tools 1 have an axis B—B inclined with respect to the axis of rotation A—A of the rotor, such that the journal axles 13 and the axles of the mounting rings 2 are also inclined along the axis B—B.

The flange 14 is axially fixed at the base of the rotor 12 by way of a single screw 16 extending through a central opening of the plate, and which is screwed in a threading provided in the lower portion of the rotor 12.

In this way, to replace the tools 1, when they are worn out, for example, it suffices to loosen the screw 16, remove the flange 14 and the washers 15, detach the tool to be replaced with its journal axle 13. To attach the new tools. One reverse process is undertaken.

The working head of the soil cultivating machine according to the invention can be equipped with at least two tools 1, but its rotor 12 can be configured to receive three tools or more, angularly and uniformly spaced apart.

Figure 6:
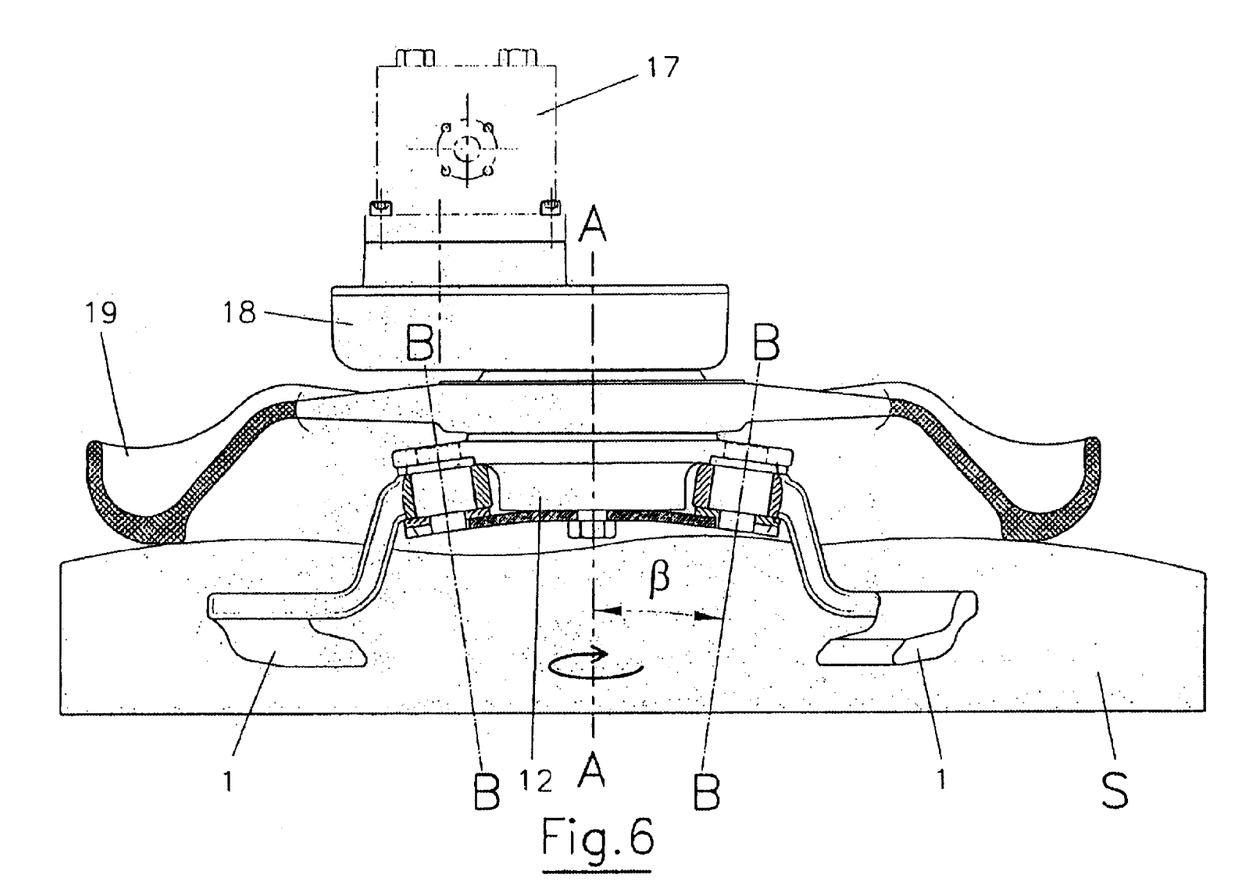
FIG. 6 is a front view, with partial cross-sections, of another example of embodiment of a weeding machine head including an application of the invention.

When the working head is equipped with two tools 1, the latter are fixed in diametrically opposed locations of the rotor 12 (FIGS. 4–7). In this case, and as shown in FIGS. 5 and 6, the support surfaces of the flange 14, constituted by the lower surfaces of the washers 15 and the central portion of the rotor 12, are placed on an arch of a circle, whereas the fixing flange is substantially planar and provided with a capacity of elastic deformation. When the screw 16 is screwed home, a concave deformation of the flange 14 occurs, whose ends are then strongly applied, by spring erect, on the washers 15 for maintaining the journal axles 13.

The rotor 12 includes a cylindrical lower port on 12a having a smaller diameter than that of its upper portion 12b beneath which the tools 1 are fixed. This cylindrical lower portion 12a serves as an abutment to limit the rearward retracting movement of the tools, when the latter encounter a hard obstacle. To this end, the rear portion of the active portion 4 of the tool has an edge 22 that comes into abutment against the cylindrical portion 12a at the end of the retracting movement of the tool.

The fixing end 2 of the tools 1 and the tool-carrying rotor 12 are arranged so as to allow a free pivoting of the tools on an angle comprised between 0 and 180 degrees and more, and, for example, a free pivoting or retraction when hard bodies (stones, etc.) are encountered, on an angle on the order of 45°–65° toward the rear, from a position occupied by the latter when the rotor rotates without encountering any resistance.

Figure 7:
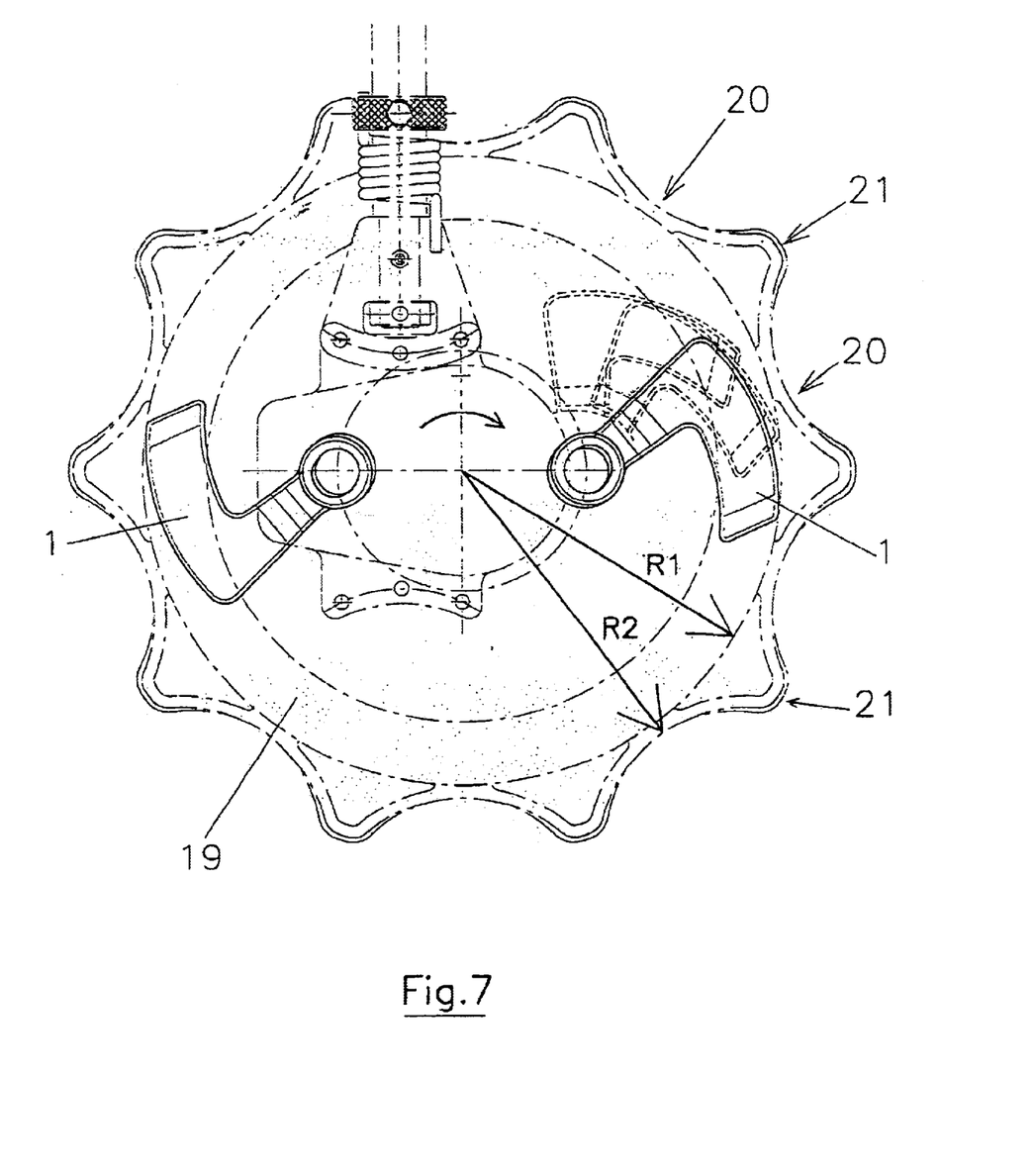
FIG. 7 is a planar view of FIG. 6, the dotted lines showing the retraction of a tool when a hard obstacle is encountered.

FIGS. 6 and 7 show an application of the invention to a weeding machine described in another commonly owned Patent Application.

According to this embodiment, the weeding head includes two tools 1 fixed on a rotor 12 driven by a motor 17 coupled to a reducer IS, and a bell-shaped circular meshing guide 19 arranged above the tools, preferably coaxially, with the axis of rotation A—A of the latter, this meshing guide 19 being capable of rotating about this axis of rotation and having, toward this axis, the general shape of a notched disc having, alternatively at its periphery, notches 20 and projecting portions 21, the length of the effective radius R1 of the rotatable tools being less then that of the radius R2 of a circle tangent to the bottom of the notches 20 of the meshing guide 19.

Preferably, the bell-shaped notched guide is mounted so as to rotate freely.

However, it could also be coupled to a motor ensuring that it is rotationally driven at a speed substantially equal to the linear advance speed of the tractor or other vehicle equipped with the weeding machine, this speed ratio being obtained, for example, by way of a known hydraulic variable-speed drive unit.

Due to this arrangement, the tools 1 with which the weeding head is equipped can thus rotate and work around the vinestocks and shrub stocks, very close to the latter but without touching them, such that they do not run the risk of being injured or sectioned by the tools. Therefore, there remains no unworked zone around the vinestocks or plant stocks.

Furthermore, obtaining the meshing guide in the form of a bell makes it possible to considerably reduce the projection of dust and stones, and to limit the operating depth of the tools. Moreover, the internal free volume of :he bell makes it possible to avoid the compression of the layer of ground loosened by the weeding tools.

The rotors of the machines equipped with tools according to the invention can rotate about their axis A—A at speeds comprised between 200 and 1500 rpm. Since the tools 1 are mounted so as to rotate freely about their journal axis B—B inclined with respect to the axis A—A, when the rotor rotates, the tools 1 are tensioned under the effect of the centrifugal force (solid lines in FIG. 7). When they encounter a hard obstacle (stone, large piece of wood, scrap iron or the like) or when the ground capacity opposes an excessive resistance to penetration, they retract by pivoting about their journal axis B—B (dotted lines in FIG. 7), which makes it possible to absorb the impacts and prevents the operating head of the machine from becoming unstable. During this retracting phase, the tools pivot rearwardly by rising, due to the inclination angle β of their journal axis B—B, such that the operating depth is reduced; this makes it possible to avoid the obstacle and to limit the torque and, therefore, the power to be transmitted to maintain the rotating speed of the rotor.

Furthermore, considering the application of the invention to a machine of the type shown in FIG. 7, it is noted that during the retracting phase, the tool, due to its shape, still draws a tangent to the outer diameter of the bell-shaped guide, such that the operating width remains constant.

Figures 8, 10:
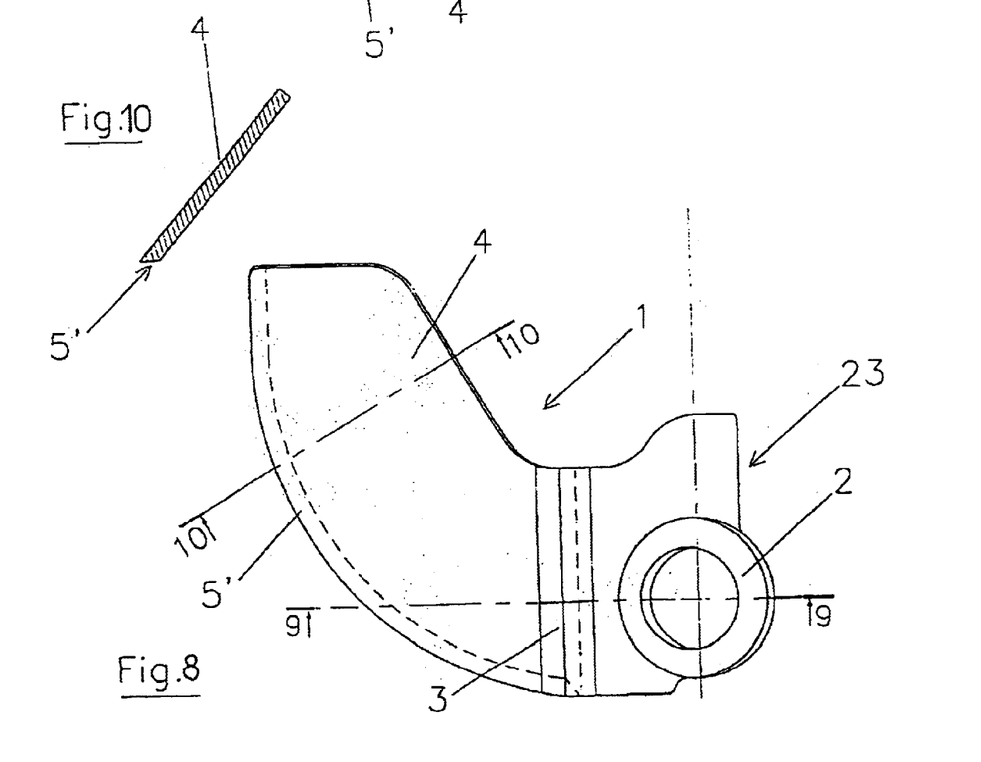
FIG. 8 is a planar view of a second embodiment of the weeding tool according to the invention.
FIG. 10 is a cross-sectional view along the line 10—10 of FIG. 8.
Figure 9:
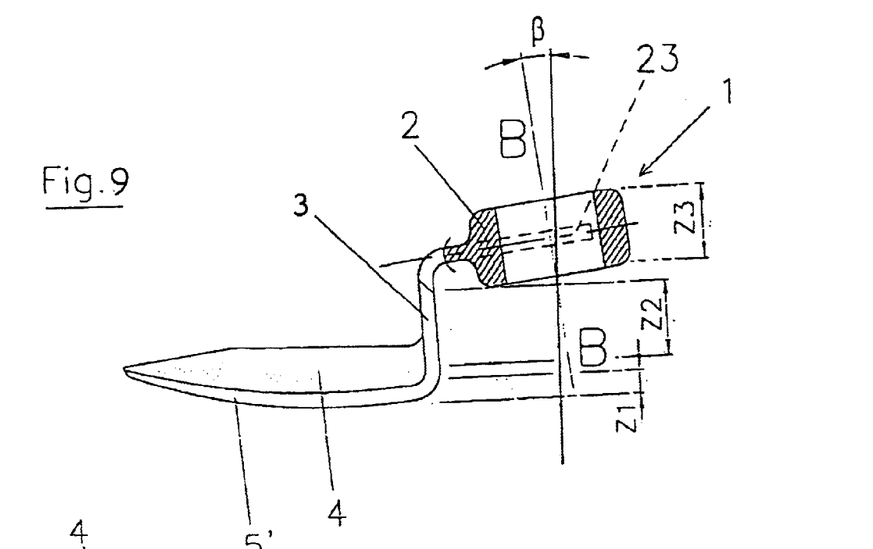
FIG. 9 is a cross-sectional view along the line 9—9 of FIG. 8.

FIGS. 8–10 show another configuration of the tool of the invention, which is more particularly interesting for working soils with thick grass. It makes it possible to cut shallow-rooted grass.

This embodiment differs from the preceding in that:

its connecting portion 3 is less inclined;

the sharp leading edge 5' of its active portion 4 is curved and extends rearwardly, considering the direction of rotation of the tool during operation;

it includes an abutment heel 23 extending from its fixing ring 2 and from its connecting portion 3.

What is claimed is:

1. A device for a soil cultivating machine, comprising:

a rotor adapted to be rotatably mounted to the soil cultivating device;

a plurality of tools interchangeably mounted on the rotor;

each of the plurality of tools comprising a fixing end, a soil engaging portion, and a connecting portion which connects the fixing end to the soil engaging portion;

each fixing end being movably mounted to the rotor via an axle;

each soil engaging portion comprising a curved member having a leading edge; and a mechanism that applies a spring force against the fixing ends of the tools such that the fixing ends of the tools are biased against the rotor, wherein the fixing ends of the tools are arranged between the rotor and the mechanism.

2. A device for a soil cultivating machine, comprising:

a rotor adapted to be rotatably mounted to the soil cultivating device;

a plurality of tools interchangeably mounted on the rotor;

each of the plurality of tools comprising a fixing end, a soil engaging portion, and a connecting portion which connects the fixing end to the soil engaging portion;

each fixing end comprising a ring portion which is freely movably mounted to the rotor via an axle;

each soil engaging portion arranged below the ring portion and comprising a plate like member having a leading edge; and a mechanism that applies a spring force against the ring portions of the tools such that the ring portions of the tools are biased against the rotor, wherein the ring portions of the tools are arranged between the rotor and the mechanism, and wherein each of the axles are oriented at an angle relative of a center axis of the rotor.

3. A tool for a soil cultivating machine having a rotor, the tool comprising:

a fixing end comprising an upper space zone, a ring adapted to receive a journal axle, and a pivot axis;

the fixing end being adapted to be pivotally and removably mounted to a rotor about the pivot axis;

a connecting portion comprising an intermediate space zone which extends downwardly from the fixing end; and an active portion comprising a lower space zone and an approximately planar portion having a sharp leading edge, wherein the active portion projects towards a direction of rotation of a rotor when the tool is installed on a rotor, wherein the fixing portion extends from an upper end of the connecting portion and wherein the active portion extends from a lower end of the connecting portion, and wherein the fixing portion extends from one side of the connecting portion and wherein the active portion extends from another side of the connecting portion.

4. The tool of claim 3, wherein the fixing end comprises an opening which is concentric to the pivot axis.

5. The tool of claim 3, wherein the soil cultivating machine comprises one of a weeding machine, a hoeing machine, and a vineyard plow when the tool is installed on a rotor.

6. The tool of claim 3, wherein the tool is adapted to be interchangeably mounted to a rotor when the tool is installed on a rotor.

7. The tool of claim 3, wherein the connecting portion is arranged to be inclined relative to a center axis running through a rotor when the tool is installed on a rotor.

8. The tool of claim 3, wherein the soil engaging portion extends radially outwardly from the fixing end.

9. The tool of claim 3, wherein the tool comprises a shape which resembles one of a hook and an "L".

10. The tool of claim 3, wherein the soil engaging portion comprises at least one curved portion.

11. The tool of claim 3, wherein the active portion has an inclined portion and includes a first lower surface and a second lower surface, the first lower surface being arranged above the second lower surface when the at least one tool is mounted on a rotor.

12. The tool of claim 3, wherein the active portion comprises a boss portion.

13. The tool of claim 3, wherein the tool is installed on a rotor which is rotatably mounted on a soil cultivating machine.

14. The tool of claim 3, wherein when the tool is mounted on a rotor, the tool is adapted to pivot freely between an angle of 0° to 180°.

15. The tool of claim 14, wherein the tool is adapted to pivot freely between an angle of 45° to 65°.

16. The tool of claim 3, wherein when the tool is mounted on a rotor, the tool is adapted to pivot freely by an angle which is equal to or greater than 180°.

17. The tool of claim 3, wherein the pivot axis is not parallel to a center axis of a rotor when the tool is mounted to a rotor.

18. The tool of claim 3, wherein when the tool is mounted on a rotor, a guide is arranged adjacent a rotor.

19. The tool of claim wherein when the tool is mounted on a rotor, a fixing flange is arranged to help retain the tool on a rotor.

20. The tool of claim 3, wherein the active portion comprises a surface that is approximately planar.

21. The tool of claim 3, wherein the active portion comprises a surface that is approximately planar and is oriented at an angle relative to a plane that is substantially perpendicular to the pivot axis.

22. The tool of claim 21, wherein the angle is on the order of 6 degrees.

23. A method of interchangeably mounting the tool of claim 3, the method comprising:

connecting the fixing end to the rotor of the soil cultivating machine, wherein the tool is free to one of pivot and rotate about an axis running through the fixing end.

24. The method of claim 23, wherein the connecting comprises arranging a journal axle within an opening of the fixing end.

25. The method of claim 23, wherein the fixing end comprises a ring and wherein the connecting comprises arranging a journal axle within a ring opening of the ring.

26. The method of claim 23, further comprising rotating the rotor in the direction of rotation.

27. The method of claim 23, further comprising rotating the rotor while the connecting portion extends downwardly from the fixing portion and while the active portion extends in the direction of rotation.

28. The method of claim 23, further comprising allowing the tool to retract about the pivot axis when the tool encounters an obstacle.

29. The method of claim 23, further comprising forming at least a portion of the active portion from a first material and at least one of the fixing end and the connecting portion of a second material, wherein the first material has greater hardness than the second material.

30. The method of claim 23, further comprising forming at least a portion of the active portion from a first material and at least one of the fixing end and the connecting portion of a second material, wherein the first material comprises a coating of greater hardness than the second material.

31. The method of claim 23, further comprising arranging a front portion of the active portion at an incline extending to the sharp leading edge.

32. The method of claim 23, wherein the pivot axis is arranged to be non-parallel to a rotor axis and further comprising allowing the tool to move about the pivot axis while the rotor rotates.

33. The method of claim 23, wherein the pivot axis is arranged to be non-parallel to a rotor axis and further comprising allowing the tool to retract about the pivot axis while the rotor rotates, whereby a distance between the sharp leading edge and the rotor axis is reduced when the tool is retracted.

34. The method of claim 23, wherein the tool is free to one of pivot and rotate, in a limited manner, about the pivot axis.

35. The method of claim 23, wherein, when mounted on the rotor, the active portion comprises a convex outer edge, a concave inner edge and a bevel which extends from the sharp leading edge.

36. The method of claim 23, wherein the pivot axis is arranged to be non-parallel to a rotor axis and further comprising allowing the tool to retract about the pivot axis while the rotor rotates, whereby a distance between the sharp leading edge and the rotor axis remains constant when the tool is at least partially retracted.

37. The method of claim 23, wherein the tool comprises a one-piece member.

38. A method of interchangeably mounting the tool of claim 3, the method comprising:

connecting the fixing end to the rotor of the soil cultivating machine with a journal axle;

removing the journal axle in order to replace the tool when the tool is worn; and installing a new tool by connecting the fixing end to the rotor with the journal axle, wherein the new tool is free to one of pivot and rotate about an axis running through the fixing end.

39. A method of interchangeably mounting the tool of claim 3, the method comprising:

connecting the fixing end to the rotor of the soil cultivating machine with a journal axle and a flange member;

removing the journal axle and the flange member in order to replace the tool when the tool is worn; and installing a new tool by connecting the fixing end to the rotor with the journal axle and the flange member, wherein the new tool is free to one of pivot and rotate about an axis running through the fixing end.

40. The method of claim 23, wherein the tool is free to one of pivot and rotate about the axis running through the fixing end such that the tool is tensioned by centrifugal force when the rotor rotates.

* * * * *